United States Patent
Sundaresan

(10) Patent No.: US 12,033,039 B2
(45) Date of Patent: Jul. 9, 2024

(54) SYSTEM AND METHOD FOR MAINTAINING NETWORK INTEGRITY FOR INCREMENTALLY TRAINING MACHINE LEARNING MODELS AT EDGE DEVICES OF A PEER TO PEER NETWORK

(71) Applicant: swarmin.ai, Fremont, CA (US)

(72) Inventor: Subash Sundaresan, Fremont, CA (US)

(73) Assignee: Subash Sundaresan, Fremont, CA (US)

( * ) Notice: Subject to any disclaimer, the term of this patent is extended or adjusted under 35 U.S.C. 154(b) by 885 days.

(21) Appl. No.: 17/113,070

(22) Filed: Dec. 6, 2020

(65) Prior Publication Data

US 2021/0256421 A1  Aug. 19, 2021

Related U.S. Application Data

(60) Provisional application No. 62/978,280, filed on Feb. 18, 2020.

(51) Int. Cl.
| | | |
|---|---|---|
| G06N 20/00 | (2019.01) | |
| H04L 9/32 | (2006.01) | |
| H04L 67/1087 | (2022.01) | |
| G06F 18/21 | (2023.01) | |
| G06F 18/214 | (2023.01) | |

(52) U.S. Cl.
CPC ......... *G06N 20/00* (2019.01); *H04L 67/1093* (2013.01); *G06F 18/2148* (2023.01); *G06F 18/217* (2023.01); *H04L 9/3213* (2013.01)

(58) Field of Classification Search
None
See application file for complete search history.

(56) References Cited

U.S. PATENT DOCUMENTS

2023/0153622 A1* 5/2023 Wu .......................... G06F 8/65
706/14

OTHER PUBLICATIONS

You, Linlin, Zihan Guo, Bingran Zuo, Yi Chang, and Chau Yuen. "SLMFed: A stage-based and layer-wise mechanism for incremental federated learning to assist dynamic and ubiquitous IoT." IEEE Internet of Things Journal (2024) (Year: 2024).*

(Continued)

*Primary Examiner* — Vincent Gonzales

(57) ABSTRACT

A method and a system for maintaining network integrity for incrementally training machine learning (ML) models at edge devices is provided. The method includes registering, by a certifying node, one or more edge devices with a peer to peer network. Upon registration, an incrementally updated ML model is received from a first registered device at the certifying node. The certifying node accepts the incrementally updated ML model if a contribution of the first edge device is within a predetermined threshold, and else rejects the updated ML model if the contribution is beyond the predetermined threshold. Limiting the contribution by each edge device enables prevention of skew by any of the edge devices at the certifying node. Upon accepting the updated ML model, the certifying node certifies the updated ML model and transfers the certified ML model to one or more other edge devices in the peer to peer network.

20 Claims, 9 Drawing Sheets

(56) References Cited

OTHER PUBLICATIONS

Yang, Qiang, Yang Liu, Tianjian Chen, and Yongxin Tong. "Federated machine learning: Concept and applications." ACM Transactions on Intelligent Systems and Technology (TIST) 10, No. 2 (2019): 1-19. (Year: 2019).*
Wang, Xiaofei, Yiwen Han, Chenyang Wang, Qiyang Zhao, Xu Chen, and Min Chen. "In-edge ai: Intelligentizing mobile edge computing, caching and communication by federated learning." Ieee Network 33, No. 5 (2019): 156-165. (Year: 2019).*

* cited by examiner

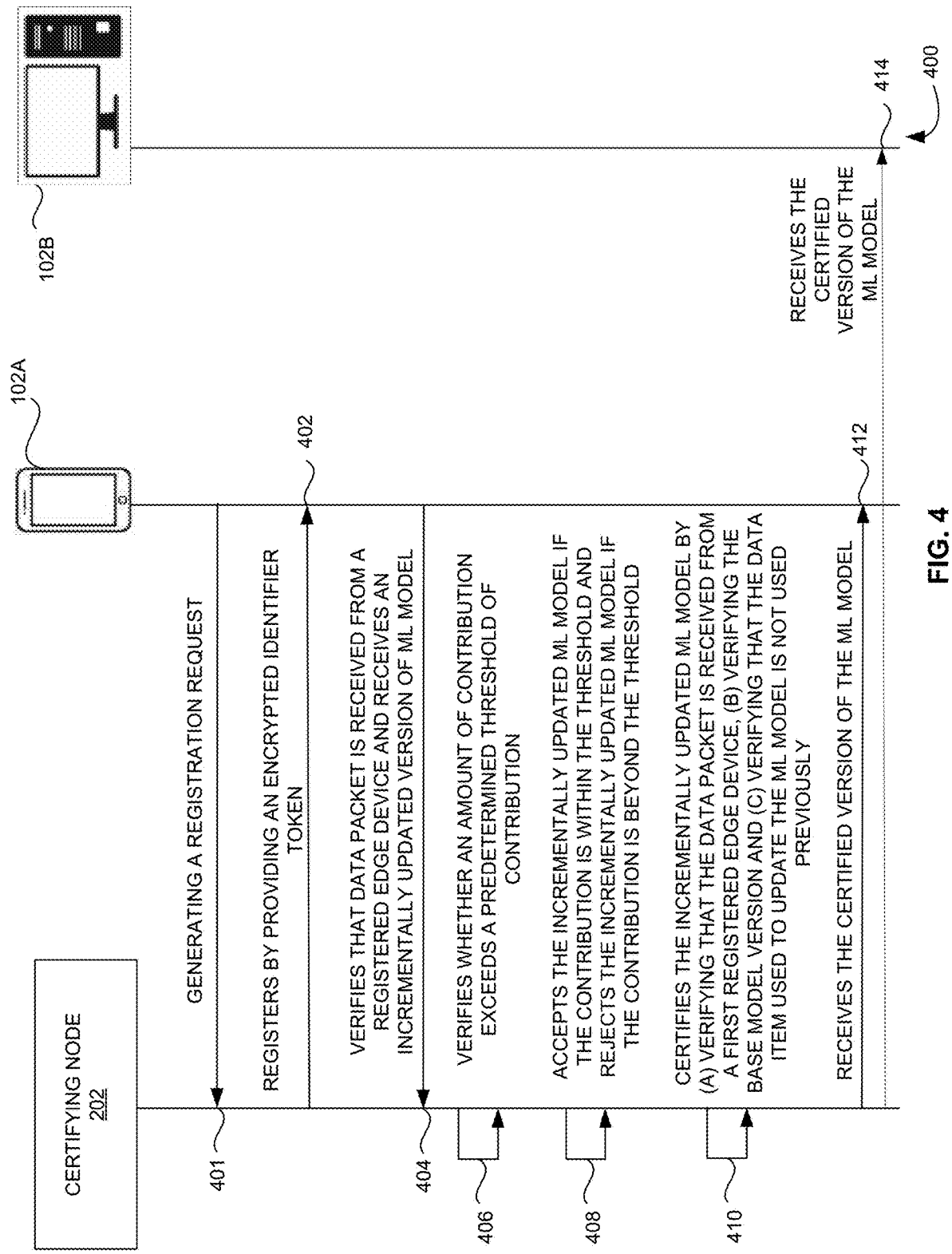

SYSTEM AND METHOD FOR MAINTAINING NETWORK INTEGRITY FOR INCREMENTALLY TRAINING MACHINE LEARNING MODELS AT EDGE DEVICES OF A PEER TO PEER NETWORK

BACKGROUND

Cross-Reference to Related Applications

This patent application claims priority to U.S. provisional patent application No. 62/978,280 filed on Feb. 18, 2020, and is related to U.S. provisional patent application No. 62/972,580 filed on Feb. 10, 2020, U.S. provisional patent application No. 62/972,590 filed on Feb. 10, 2020, U.S. provisional patent application No. 62/978,277 filed on Feb. 18, 2020, U.S. provisional patent application No. 62/965,099 filed on Jan. 23, 2020, the complete disclosures of which, in their entirety, are hereby incorporated by reference.

TECHNICAL FIELD

Embodiments of this disclosure generally relate to training machine learning models, and more particularly, to system and method for maintaining network integrity for incrementally training machine learning models at edge devices of a peer to peer network.

DESCRIPTION OF THE RELATED ART

Machine Learning (ML) or Artificial Intelligence (AI) systems are prevalent in human lives and are intelligent as well as smarter. Typically, ML systems are trained with one or more data sets that include, for each record, a value for each of a set of parameters, and a result. The ML systems are used for various commonly seen use cases such as personalization of user experiences, recommendation of products, medical diagnosis, and many others. All conventional ML systems follow certain data flow architecture. FIG. 1 illustrates a conventional data flow architecture 100 for training an ML model. The conventional data flow architecture 100 involves sending data associated with a user 104A from one or more edge devices 102A-N to a server 108 over a network 106, aggregating all the user data at the server 108 and training a ML model on the aggregated user data in the server 108. Typically, the data associated with one or more users 104A-N includes, for example data associated with usage of applications or websites. The trained ML model is then used for real time decision making by the server 108, for example for personalization of user experience, product recommendations, medical diagnosis and the like. The trained ML model is also transferred to the one or more edge devices 102A-N for real time decision making by the one or more edge devices 102A-N. The one or more edge devices 102A-N may include smartphones, tablets, computers, smart watches, IOT devices, connected vehicles, and the like.

However, the conventional ML architecture has several key problems. For instance, sending user data to the server 108 causes privacy and/or security concerns since the user data may be shared with third parties without their permission, or could be used for purposes for which the user may not have provided permission. Further, the user data on such the server 108 may be hacked by malicious actors, thereby causing data leaks. The user data may include sensitive data of the user, such as health or financial records, or location data, among many others. Due to the above privacy and data security concerns, many users of applications and websites may be reluctant to send such valuable data to the server 108, thereby potentially denying the benefits that ML models trained based on that data may provide to end users, for example, being able to diagnose diseases based on medical data signals. Additionally, known techniques of training ML models is slow learning, as the aggregation of data and updating of the training of the models is done periodically (say, once or twice per day) and not in a continuous manner. Moreover, the ML model generated based on known training techniques typically constitutes large file sizes imposing significant load on the network on being repeatedly transmitted to the server 108.

SUMMARY

In view of the foregoing, an embodiment herein provides a certifying node for maintaining a network integrity for incrementally training machine learning models at one or more edge devices in a peer to peer network, wherein the certifying node is communicatively connected with the one or more edge devices in the peer to peer network. The certifying node is configured to (i) receive an incrementally updated version of a machine learning (ML) model from a first registered edge device of a plurality of registered edge devices, (ii) quantify an amount of contribution to the incrementally updated version of the ML model by the first registered edge to compare the amount of contribution with a predetermined threshold amount of contribution, (iii) perform at least one of (a) rejecting the incrementally updated version of the ML model from the first registered edge device if the amount of contribution is above the predetermined threshold amount of contribution, or (b) accepting the incrementally updated version of the ML model from the first registered edge device if the amount of contribution is below the predetermined threshold amount of contribution by verifying that each of the at least one data packet associated with said incrementally updated ML model is received from the plurality of registered edge devices, verifying an encrypted data that specifies a base model version of the ML model from which the incrementally updated version of the ML model is derived, and verifying that a data item used for the incrementally updated version of the ML model is not used previously by any of the plurality of registered edge devices for incremental training of the ML model to obtain a certified version of the ML model, and, (c) transmit the certified version of the ML model to the plurality of registered edge devices for incrementally training ML models at the plurality of registered edge devices in the peer to peer network.

In some embodiments, the certifying node is further configured to register the one or more edge devices with the peer to peer network based on a registration request from the one or more edge devices using an encrypted identifier token associated with the registration request to obtain the plurality of registered edge devices.

In some embodiments, the certifying node is further configured to verify each of the at least one data packet from the plurality of registered edge devices using an encrypted identifier token, wherein the encrypted identifier includes at least one of a login credential associated with a user of the plurality of registered edge devices or a device identifier of the plurality of registered edge devices for performing device based authentication.

In some embodiments, the certifying node is further configured to determine the predetermined threshold of contribution based on a number of edge devices that are registered with the certifying node at any given time.

In some embodiments, certifying node is further configured to prevent skewing of the ML model by any of the plurality of registered edge devices by limiting the amount of contribution for at least one of the plurality of registered edge devices.

In some embodiments, certifying node is further configured to prevent skewing of the ML model by limiting a transmission of data by each of the plurality of registered edge devices compared an average transmission of data by the plurality of registered edge devices.

In some embodiments, certifying node is further configured to verify that the incrementally updated version of the ML model is derived from a latest certified version of the ML model using a persistent file format of the ML model encrypted with at least one of a unique signature of the plurality of registered edge devices, a timestamp of update, or a secret salting parameter.

In some embodiments, the certifying node is further configured to prevent denial of services attack from the plurality of registered edge devices by implementing a logic for monitoring either a count of connection requests or a count of the incrementally updated version of the ML model submitted by each of the plurality of registered edge devices.

In some embodiments, certifying node is further configured to accept a connection request from the plurality of registered edge devices to the certifying node by validating an identifier token associated with each of the plurality of registered edge devices.

In some embodiments, the certifying node is further configured to transmit the certified version of the ML model to the plurality of registered edge devices in the peer to peer network for use in the real time incremental training of the certified version of the ML model or for use in real-time decision making at the one or more edge devices.

In one aspect, there is provided a method of operating a certifying node of a peer to peer network that is configured to be coupled in communication with one or more edge devices of the peer to peer network. The certifying node is configured to maintain network integrity for incrementally training ML models at one or more edge devices in a peer to peer network. The method includes configuring the certifying node to (i) receive an incrementally updated version of an ML model from a first registered edge device of a plurality of registered edge devices, (ii) quantify an amount of contribution to the incrementally updated version of the ML model by the first registered edge to compare the amount of contribution with a predetermined threshold amount of contribution, (iii) perform at least one of (a) rejecting the incrementally updated version of the ML model from the first registered edge device if the amount of contribution is above the predetermined threshold amount of contribution, or (b) accepting the incrementally updated version of the ML model from the first registered edge device if the amount of contribution is below the predetermined threshold amount of contribution by verifying that each of the at least one data packet associated with said incrementally updated ML model is received from the plurality of registered edge devices, verifying an encrypted data that specifies a base model version of the ML model from which the incrementally updated version of the ML model is derived, and verifying that a data item used for the incrementally updated version of the ML model is not used previously by any of the plurality of registered edge devices for incremental training of the ML model to obtain a certified version of the ML model, and, (c) transmit the certified version of the ML model to the plurality of registered edge devices for incrementally training ML models at the plurality of registered edge devices in the peer to peer network.

In some embodiments, the method further includes configuring the certifying node to verify each of the at least one data packet from the plurality of registered edge devices using an encrypted identifier token, wherein the encrypted identifier includes at least one of a login credential associated with a user of the plurality of registered edge devices or a device identifier of the plurality of registered edge devices for performing device based authentication.

In some embodiments, the method further includes configuring the certifying node to determine the predetermined threshold of contribution based on a number of edge devices that are registered with the certifying node at any given time.

In some embodiments, the method further includes configuring the certifying node to prevent skewing of the ML model by any of the plurality of registered edge devices by limiting the amount of contribution for at least one of the plurality of registered edge devices.

In some embodiments, the method further includes configuring the certifying node to prevent skewing of the ML model by limiting a transmission of data by each of the plurality of registered edge devices compared an average transmission of data by the plurality of registered edge devices.

In some embodiments, the method further includes configuring the certifying node to verify that the incrementally updated version of the ML model is derived from a latest certified version of the ML model using a persistent file format of the ML model encrypted with at least one of a unique signature of the plurality of registered edge devices, a timestamp of update, or a secret salting parameter.

In some embodiments, the method further includes configuring the certifying node to prevent denial of services attack from the plurality of registered edge devices by implementing a logic for monitoring either a count of connection requests or a count of the incrementally updated version of the ML model submitted by each of the plurality of registered edge devices.

In some embodiments, the method further includes configuring the certifying node to validate an identifier token associated with each of the plurality of registered edge devices that transmit a connection request to the certifying node.

In some embodiments, the method further includes configuring the certifying node to accept a connection request from the plurality of registered edge devices to the certifying node by validating an identifier token associated with each of the plurality of registered edge devices.

In another aspect, there is provided a computer program product comprising a non-transitory computer-readable storage medium having computer-readable instructions stored thereon, computer-readable instructions being executable by a computerized device comprising processing hardware to execute a method of operating a certifying node of a peer to peer network, wherein the certifying node is configured to be coupled in communication with one or more edge devices of the peer to peer network, wherein the certifying node is configured to certify incrementally trained ML models. The certifying node is configured to be communicatively connected with one or more edge devices of a peer to peer network. The method includes configuring the certifying node to (i) receive an incrementally updated version of an ML model from a first registered edge device of a plurality of registered edge devices, (ii) quantify an amount of contribution to the incrementally updated version of the ML model by the first registered edge to compare the amount of contribution with a predetermined threshold amount of contribution, (iii) perform at least one of (a) rejecting the incrementally updated version of the ML model from the first registered edge device if the amount of contribution is above the predetermined threshold amount of contribution, or (b) accepting the incrementally updated version of the ML model from the first registered edge device if the amount of contribution is below the predetermined threshold amount of contribution by verifying that each of the at least one data packet associated with said incrementally updated ML model is received from the plurality of registered edge devices, verifying an encrypted data that specifies a base model version of the ML model from which the incrementally updated version of the ML model is derived, and verifying that a data item used for the incrementally updated version of the ML model is not used previously by any of the plurality of registered edge devices for incremental training of the ML model to obtain a certified version of the ML model, and, (c) transmit the certified version of the ML model to the plurality of registered edge devices for incrementally training ML models at the plurality of registered edge devices in the peer to peer network.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 4 is an interaction diagram that illustrates a method of maintaining network integrity during incremental training of machine learning models at an edge device of a peer to peer network, in accordance with the embodiments herein;

DETAILED DESCRIPTION OF PREFERRED EMBODIMENTS

Figure 1:
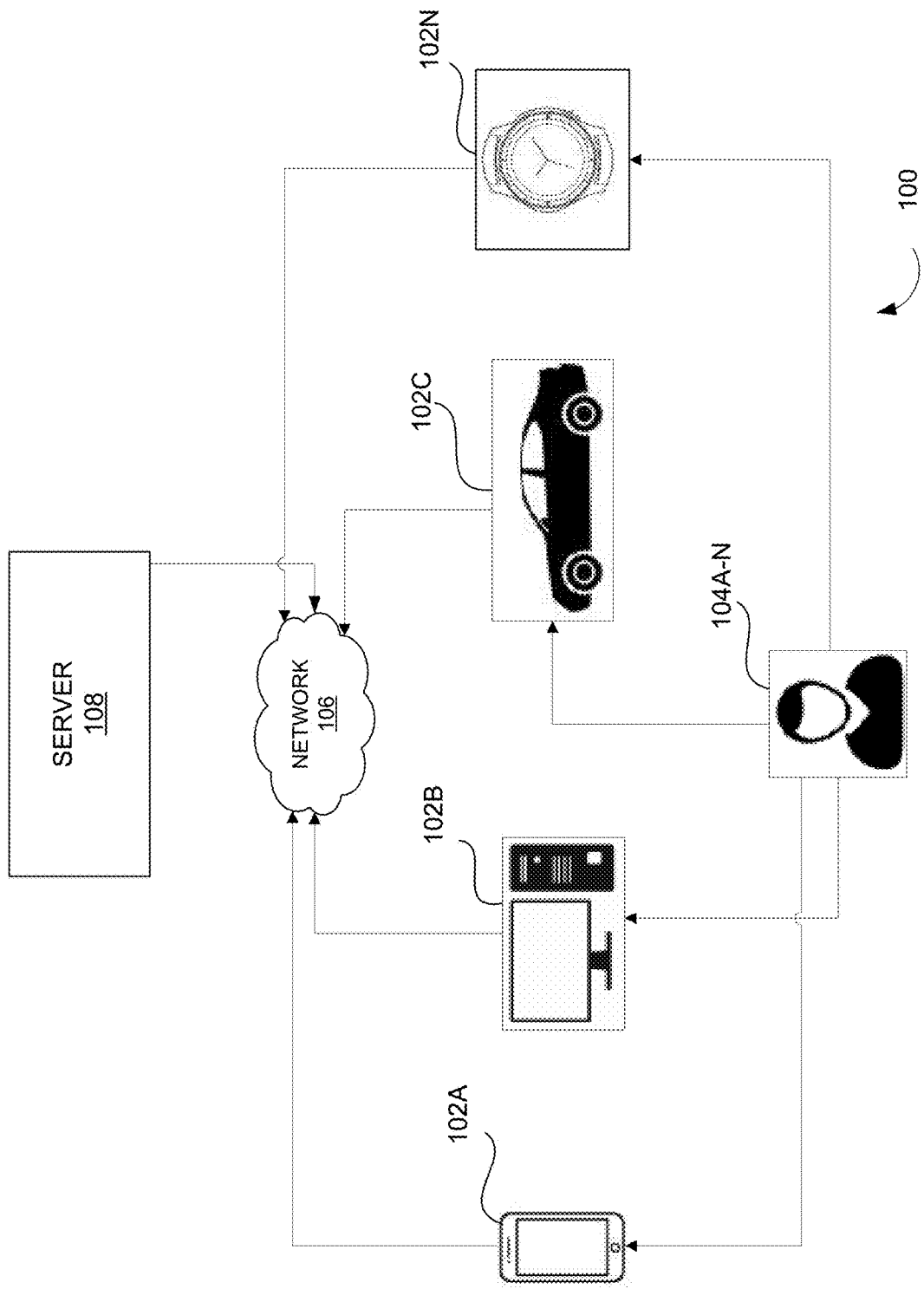
FIG. 1 illustrates a conventional network architecture for training a machine learning model on a server.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments disclosed herein propose a system and a method of maintaining network integrity for incrementally training machine learning (ML) models at edge devices of a peer to peer network. Referring now to the drawings, and more particularly to FIGS. 2 through 6, where similar reference characters denote corresponding features consistently throughout the figures, there are shown preferred embodiments.

As mentioned, there remains need for a system and method for maintaining network integrity for incrementally training one or more ML models at one or more edge devices of a peer to peer network that ensures privacy of user data and enables training of the one or more ML models without any un-authorized interference from third party devices. The embodiments herein achieve this by proposing a system and a method for maintaining a network integrity for incrementally training the one or more ML models at the one or more edge devices in the peer to peer network. Referring now to the drawings, and more particularly to FIGS. 2 through 6, where similar reference characters denote corresponding features consistently throughout the figures, there are shown preferred embodiments.

As used herein the term "ML model" may refer to a mathematical representation of a real-world training process, in which a learning algorithm may be configured to find patterns in a training data such that one or more input parameters correspond to a target and an output of the training process is an ML model that may be subsequently used to make one or more predictions. The term "machine learning process" as used herein may refer to a process that tunes one or more parameters to be simultaneously optimal on a training dataset using one or more machines.

Figure 2:
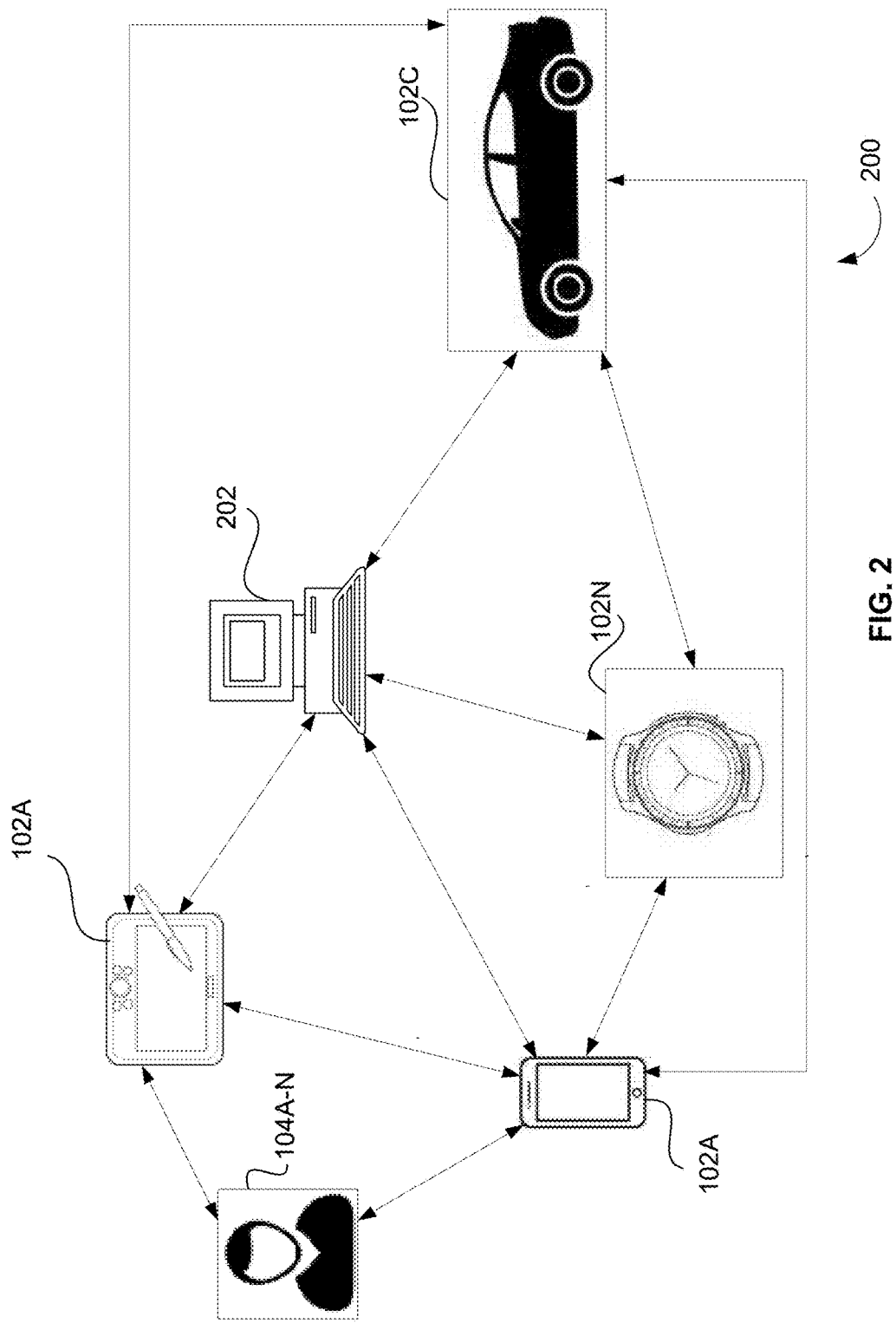
FIG. 2 is a block diagram of a system configured for maintaining network integrity during incremental training of one or more machine learning (ML) models at one or more edge devices of a peer to peer network in conjunction with a certifying node, in accordance with an embodiment herein.

FIG. 2 is a block diagram of a system configured for maintaining network integrity during incremental training of one or more machine learning (ML) models at one or more edge devices of the peer to peer network in conjunction with a certifying node, in accordance with the embodiments herein. The system includes one or more edge devices 102A-N that are associated with one or more users 104A-N, and a certifying node 202. The one or more edge devices 102A-N are communicatively connected to each other through a peer to peer network. In various embodiments, the peer to peer network may include a single network or a combination of different networks. Examples of the peer to peer network may include, but are not limited to, a local area network (LAN), a wide area network (WAN), a public network, a private network, a proprietary network, a Public Telephone Switched Network (PSTN), the Internet, a wireless network, a virtual network, or any combination thereof. Examples of the one or more edge devices 102A-N include but not limited to smartphones, tablets, computers, smart watches, IOT devices, connected vehicles, and the like. In some embodiments, the one or more edge devices 102A-N may also include various network access points, such as, wired or wireless access points including base stations, internet exchange points or any other type of entity having computation and networking capabilities.

In an embodiment, the certifying node 202 receives registration requests from the one or more edge devices 102A-N for joining the peer to peer network. The certifying node 202 registers the one or more edge devices 102A-N, and provides an encrypted identifier token for each of the one or more edge devices to authenticate any subsequent requests from the one or more edge devices 102A-N that are registered. Upon registration, the one or more edge devices 102A-N may be referred to as the one or more registered edge devices 102A-N. The registered edge devices 102A-N may incrementally update a base version of the ML model upon occurrence of an event at each of the one or more registered devices 102A-N based on an event data. The process of incremental update of the ML models is described further along with FIG. 3A.

The certifying node 202 may be configured to receive an incrementally updated version of an ML model from a first registered edge device. The certifying node 202 may be configured to quantify an amount of contribution to the incrementally updated version of the ML model by the first registered edge to compare the amount of contribution with a predetermined threshold amount of contribution. The certifying node 202 may be configured to perform either (a) rejecting the incrementally updated version of the ML model from the first registered edge device if the amount of contribution is above the predetermined threshold amount of contribution, or (b) accepting the incrementally updated version of the ML model from the first registered edge device if the amount of contribution is below the predetermined threshold amount of contribution by verifying that each of the one or more data packet associated with said incrementally updated ML model is received from the plurality of registered edge devices, verifying an encrypted data that specifies a base model version of the ML model from which the incrementally updated version of the ML model is derived, and verifying that a data item used for the incrementally updated version of the ML model is not used previously by any of the plurality of registered edge devices for incremental training of the ML model to obtain a certified version of the ML model. The certifying node 202 may be configured to transmit the certified version of the ML model to the plurality of registered edge devices for incrementally training ML models at the plurality of registered edge devices in the peer to peer network.

Subsequent to registration of the one or more edge devices 102A-N, the certifying node 202 receives the incrementally updated ML model from the one or more registered edge devices 102A-N in the peer to peer network. The certifying node 202 certifies the incrementally updated ML model by (a) verifying that the data packet is received from a registered edge device 102A, (b) verifying an encrypted data that specifies a base model version from which the incrementally updated version of the ML model was derived and/or (c) verifying, using a unique encrypted signature associated with each data item, that the data item used to generate the incrementally updated version of the ML model has not been used previously by same or other edge devices of the peer to peer network. In an embodiment, the incrementally updated ML model includes one or more parameters and one or more weights associated with the parameters. The parameters and weights associated with the incrementally updated version of the ML models pertain to a data event respectively at the one or more registered edge devices 102A-N generating the incrementally updated version of the ML models. In an embodiment, the incrementally updated model ML is devoid of event data that is used to incrementally train the ML model. Examples of the parameters may include, but are not limited to gender, age, location, category of the content on the website or application, and the like. The weights indicate an amount of importance each of the parameters are given in the decisions made by the ML model. For example, gender may have a weight of 0.4, while age may have a weight of 0.3. The weights and/or the parameters associated with the ML models are updated in real-time based on the data events respectively at the one or more registered edge devices 102A-N.

In an embodiment, the incremental training is performed by updating one or more weights associated with one or more of the parameters of the ML model during a predetermined window of time. The predetermined window of time may include, for example, one individual event or a short batch of events. In an embodiment, the predetermined window of time may be configurable. The incrementally updated ML models may be subsequently used for decisioning, for example for personalization or product recommendations or medical diagnosis. In an embodiment, the updates are applied in real-time on receipt of an event data. The incremental training of the ML models enables ML to happen in real-time, as soon as the event that is associated with the data packet occurs on the one or more registered edge devices 102A-N thereby improving the quality of the decisions made by the ML model.

In several instances, a first registered edge device 102A may exert undue influence on the network 106, and skew the ML model based on training data of the registered edge device 102A, versus training data from other edge devices. Likewise, the first registered edge device 102A may flood the system with massive amounts of data packets or incrementally updated ML model updates that would constitute a denial of service (DOS) attack on a distributed system. The edge device may also overwrite valid learnings from other edge devices on the network 106. Hence, there is a need for facilitating network integrity and network security during concurrent incremental training of ML models at the edge devices 102A-N.

Various embodiments of the system and method disclosed herein enables maintaining network integrity during the incremental training of ML models at the one or more edge devices 102A-N. In an embodiment, the certifying node 202 (*a*) accepts the incrementally updated ML model version from the first registered edge device 102A if the amount of contribution by the first registered edge device is within a predetermined threshold of contribution, and b) rejects the incrementally updated ML model version from the first registered edge device if the amount of contribution is beyond the predetermined threshold of contribution. Limiting the contribution by each edge device enables prevention of skew by any of the edge devices at the certifying node by preventing transmission of unusually large amount of data compared to other edge devices. Upon accepting the incrementally updated ML model, the certifying node certifies the updated ML model by performing at least one of: (a) verifying the encrypted data that specifies the base model version from which an ML model version was derived and (b) verifying, using a unique encrypted signature associated with each data item, that the data items using which the ML model version was incrementally updated has not been used previously by same or different edge device for incremental training of ML model. In some embodiments, the certified candidate ML model is used for real-time decision making at the one or more edge devices 102A-N in the peer to peer network. In some embodiments, the certifying node 202 transfers the candidate ML model to each of one or more edge devices 102A-N in the peer to peer network for real-time incremental training as well as for real time decision making.

In some embodiments, the certified candidate ML model is incrementally updated on any of one or more edge devices 102A-N by updating one or more parameters and weights associated with the one or more parameters upon occurrence of a data event at the respective edge devices. The update to the certified candidate ML model is layered upon certified candidate ML model.

In some embodiments, the certifying node 202 maintains a record of a number of data packets used by each edge device for incrementally training the candidate ML model to prevent undue contribution by each edge device in incremental training of the candidate ML model. In some embodiments, the certifying node 202 ensures that each update to the candidate ML model is layered on top of the last certified ML model to avoid overwriting of previously certified ML model by the edge device. In some embodiments, the certifying node 202 ensures that the candidate ML model originated from the first registered edge device 102A by verifying an encrypted identifier token associated with each of the one or more registered devices 102A-N. In some embodiments, the certifying node 202 maintains a count of contributions by each edge device, such that neither an update to the ML model is skipped nor any update to the ML model is counted more than once.

Figure 3A:
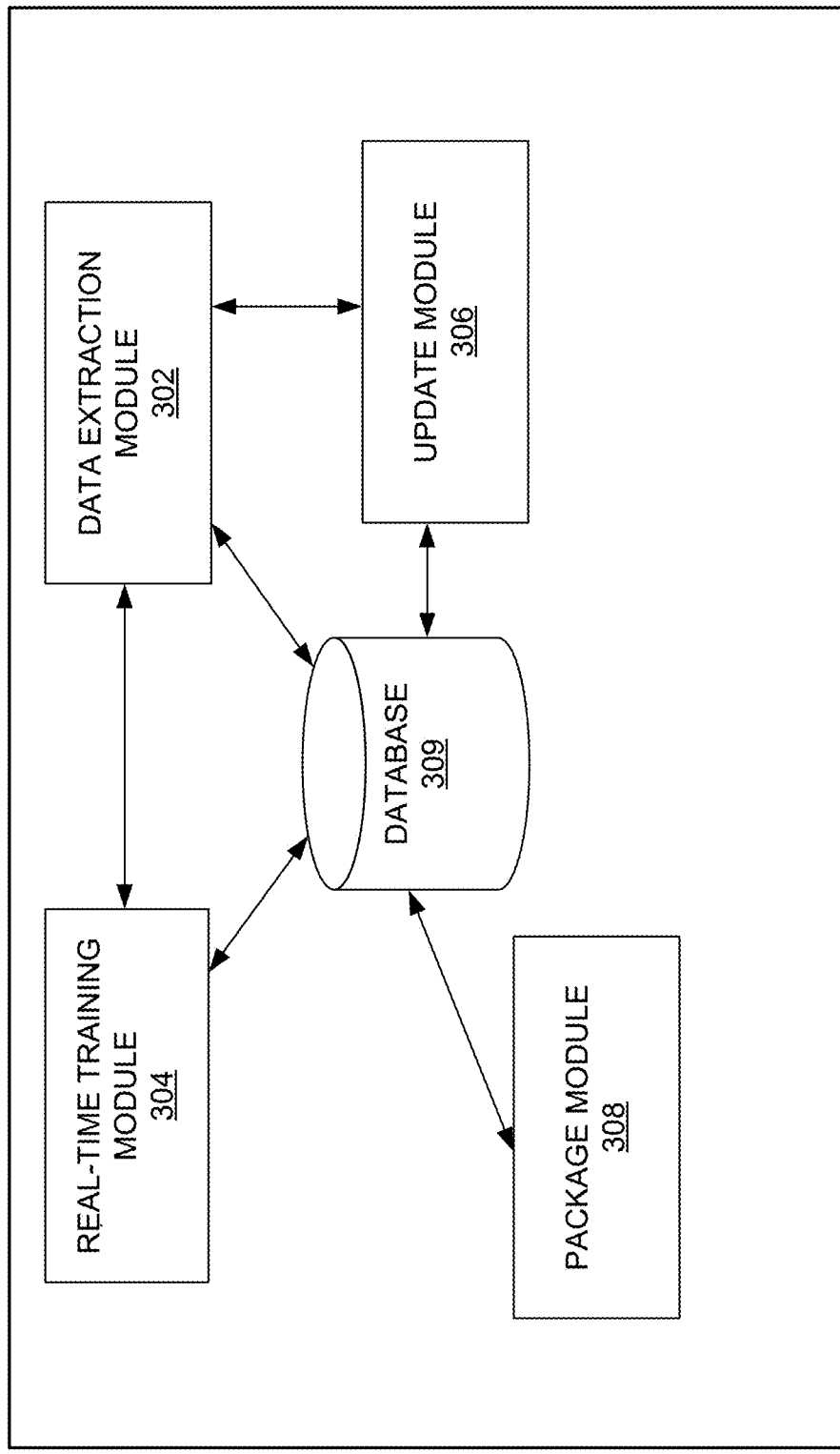
FIG. 3A illustrates a block diagram of an incremental training unit associated with one or more edge devices of the peer to peer network of FIG. 2 for enabling incremental training of ML models at the edge devices, in accordance with an embodiment.

FIG. 3A illustrates a block diagram of an incremental training unit 300 associated with one or more edge devices of the peer to peer network of FIG. 2 for enabling incremental training of ML models at the edge device, in accordance with an embodiment. In an embodiment, the incremental training unit 300 may be implemented in one or more edge devices 102A-N. In an embodiment, the incremental training unit 300 includes one or more of a data extraction module 302, a real-time training module 304, an update module 306, and a package module 308 communicatively associated with a database 309. In various embodiments, the incremental training unit 300 may be implemented as a software development kit (SDK) that may be configured to get associated with one or more applications on the one or more edge devices 102A-N. The data extraction module 302 is operable to generate a base version of the ML model on each of the one or more edge devices 102A-N using an authorized program. In an embodiment, the data extraction module 302 generates the base version of the ML model comprising learnings that are based on data previously seen by edge devices in the peer to peer network of devices by removing any underlying event data and retaining one or more parameters and one or more weights associated with the parameters. In an embodiment, the real-time training module 304 incrementally trains a base version of the ML model at each of the one or more edge devices 102A-N upon occurrence of a data event at the respective edge devices 102A-N. The incremental training is performed by updating one or more weights associated with the one or more parameters of the ML model during a predetermined window of time. The predetermined window of time may include, for example, one individual event or a short batch of events. In an embodiment, the predetermined window of time may be configurable. In an embodiment, the updates are applied in real-time on receipt of an event data. The ML model includes learnings based on data previously seen by other edge devices in the network environment. In an embodiment, the learnings are devoid of an underlying event data used to generate the incremental version of the ML model. During the incremental training process described herein, a previous version of the ML model may be used as a baseline, or if no such previous version of the ML model is available, then a base version of the ML model may be generated and/or used.

In an embodiment, the package module 308 is configured to share one or more updated weights associated with parameters and/or the parameters of the incrementally trained ML model from the first registered edge device 102A to one or more other edge devices 102B-N in the peer to peer network of devices. In an embodiment, the weights and/or the parameters shared between the edge devices are devoid of any of the underlying data items used to generate the incremental version of the ML model, such as the event data, thereby ensuring data security. In an embodiment, the update module 306 is configured to update an ML model available on each of the edge devices based on the one or more updated weights received from the real-time incremental training of the ML model at other edge devices in the peer to peer network. During a first instance, a base version of the ML model available at the edge devices may be updated based on the one or more updated weights and or parameters received from other edge devices. Upon subsequent receipts of the weights and/or parameters from other edge devices, the update module 306 may update the updated version of the ML model. The real-time training module 304 incrementally trains the updated ML model upon occurrence/receipt of a data event at each of the edge devices. For example, upon receiving a user selection of purchase items in an application in a mobile phone of a user, the user device incrementally trains the updated ML model based on the data associated with user selection.

Figure 3B:
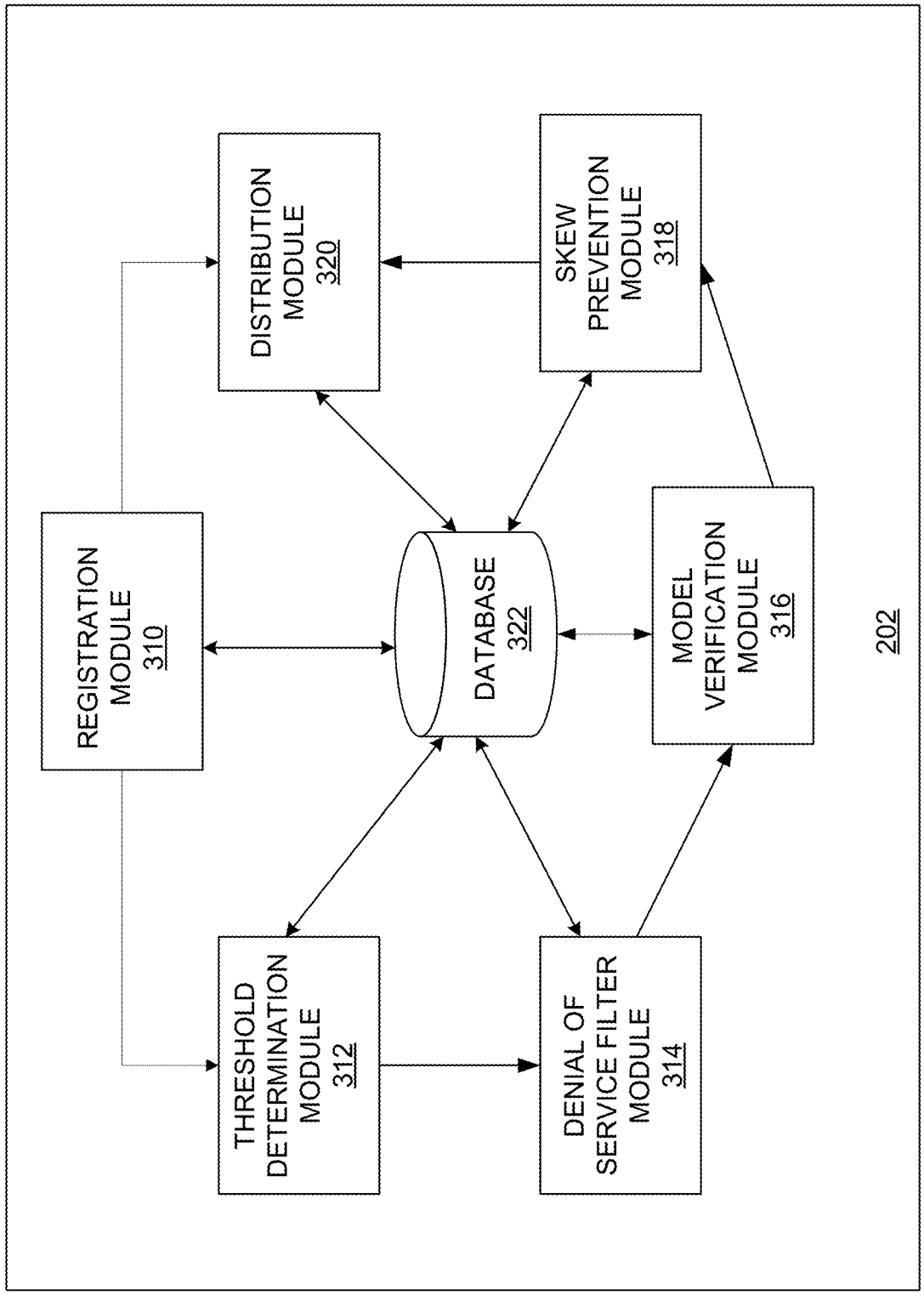
FIG. 3B illustrates a block diagram of the certifying node, for enabling maintaining of network integrity during incremental training of ML models at an edge device, in accordance with the embodiments herein.

FIG. 3B illustrates a block diagram of the certifying node 202 of FIG. 2 in accordance with the embodiments herein. In various embodiments, the certifying node 202 may be implemented as a software development kit (SDK) that may be configured to get associated with one or more applications on the certifying node 202. The certifying node 202 includes a registration module 310, a threshold determination module 312, a denial of service filter module 314, a model verification module 316, a skew prevention module 318 and a distribution module 320. One or more modules in the certifying node 202 are associated with a database 322. In some embodiments, the one or more modules in the certifying node 202 may be implemented as hardware components such as electronic chips, electronic circuits etc.

The registration module 310 receives registration requests from one or more edge devices 102A-N for joining the peer to peer network and registers the edge devices 102A-N with the certifying node 202 by providing the encrypted identifier token based on at least one of: (a) a login credentials associated with a user or (b) a device identifier of one or more edge devices 102A-N, to authenticate any subsequent requests from each of the one or more edge devices 102A-N. In an embodiment, the encrypted identifier token may include an ID token or an access token.

The threshold determination module 312 determines a base threshold of contribution based on a function of a count of a number of registered edge devices in the peer to peer network. The threshold determination module 312 further configures a margin parameter for the one or more registered devices 102A-N, wherein the margin parameter ranges between 0 to 1 and determines a threshold of contribution for the plurality of registered edge devices. In an exemplary embodiment, if the percentage is set to 50%, then a given edge device is allowed to contribute 50% more events than an average contribution of the peer to peer network.

The denial of service filter module 314 accepts a candidate ML model from the first registered edge device 102A when a connection requested by the first registered edge device 102A qualifies a denial of service filter to make sure that if an edge device 102A-N attempts a denial of service attack by sending too many requests to the certifying node 202, those connection requests may be denied by the certifying node 202. In an embodiment, the denial of service filter module 314 may include a logic for monitoring a count of connection requests or a count of incrementally updated ML models submitted. In an embodiment, the denial of service filter module 314 validates an ID token of the first registered edge device 102A that sends a connection request to the certifying node 202.

The model verification module 316 receives a candidate ML model from one or more registered edge device 102A-N in the peer to peer network over the network 106. In an embodiment, the candidate ML model is an incrementally updated ML model. In an embodiment, the candidate ML model includes one or more parameters and one or more weights associated with the one or more parameters. The model verification module 316 verifies a data item used to train the candidate ML model based on a unique metadata associated with the data item. The model verification module 316 further verifies that a received candidate ML model is derived from a latest certified version of the ML model using a persistent file format of the ML model encrypted with one or more of a unique signature of the registered edge device 102A, a timestamp of update and/or a secret salting parameter.

The skew prevention module 318 prevents skew in the certified ML model by updating the certified ML model when the contribution of the first registered edge device 102A is less than a predetermined threshold of contribution. In an embodiment, the predetermined threshold of contribution may be preset. In another embodiment, the predetermined threshold of contribution may be set in real-time by the certifying node 202 based on a criterion. The skew prevention module 318 ensures that no single edge device of the one or more registered devices 102A-N can have undue influence on the cumulative model by contributing an extraordinary number of data points to the ML model. The distribution module 320 distributes certified ML model to all the one or more registered devices 102A-N in the peer to peer network for real-time incremental training of the candidate ML model as well as for real-time decision making. In an embodiment, the skew prevention module 318 may compute one or more coefficients of variation to numerically determine a measure of skew of the incrementally updated ML model from the certified ML model. The measure of skew may be compared with the predetermined threshold to update the certified ML model.

The incrementally trained ML models may be used for various purposes, such as for example, sensitive health signals that are available to an application on a wearable device such as, a smart watch may be used to train ML models that may enable prediction of a user's probability of getting a disease, without being concerned about security or privacy issues associated with sending sensitive data to a server.

In an exemplary embodiment, the incrementally trained ML model may be used to diagnose diseases. The certifying node 202 may have a test dataset that includes one or more input data, and an output data for the one or more input data for the diagnosis of the disease. The one or more input data may include patient data such as age, gender, and ethnicity, socio-economic data, risk factors such as obesity, high blood pressure and diabetes etc., laboratory data, or treatment data. The output data may include an actual outcome value for the diagnosis. The certifying node 202 may execute the candidate ML model against the one or more input data to generated a predictive outcome value for the diagnosis. (say, presence or absence of the disease, likelihood of being admitted to an ICU, or dying, etc.). Further, the certifying node 202 may compare the predictive outcome value for diagnosis with the actual outcome value for the diagnosis to determine the quality of the candidate ML model. The certifying node 202 may certify the candidate ML model if the measure of quality is high.

FIG. 4 is an interaction diagram that illustrates a method 400 of maintaining network integrity during incremental training of ML models at an edge device of a peer to peer network, according to some embodiments herein. At step 401, the method 400 includes generating, at an edge device 102A, a registration request for registering the edge device 102A. In an embodiment, the registration request includes an encrypted identifier token that uniquely identifies the edge device 102A. At step 402, the method 400 includes registering the first edge device 102A with the peer to peer network by a certifying node 202 by providing the encrypted identifier token. The certifying node 202 may be communicatively associated with one or more edge devices 102A-N of the peer to peer network and may be configured to control the incremental training of the ML models in the peer to peer network. At step 404, the method 400 includes verifying that a data packet is received from the first registered edge device 102A and receiving an incrementally updated version of ML model at the certifying node 202. At step 406, the method 400 includes verifying at the certifying node 202, whether an amount of contribution by the first registered edge device 102A exceeds a predetermined threshold of contribution. At step 408, the method 400 includes accepting at the certifying node 202 the incrementally updated ML model version from the first registered edge device 102A if the contribution is within the predetermined threshold, and rejecting at the certifying node 202, the incrementally updated ML model version from the first registered edge device 102A if the contribution is beyond the predetermined threshold.

At step 410, the method 400 includes certifying at the certifying node 202, the incrementally updated ML model by performing one of: (a) verifying that the data packet is received from the first registered edge device 102A, (b) verifying an encrypted data that specifies a base model version from which an ML model version is derived and (c) verifying, using a unique encrypted signature associated with each data item, that the data items used for incrementally update of the ML model is not used previously by same or different edge device for incremental training of ML models. At step 412, the method 400 includes receiving, at the first registered edge device 102A in the peer to peer network, the certified version of the ML model from the certifying node 202. At step 414, the method 400 includes receiving, at a second edge devices 102B in the peer to peer network, the certified version of the ML model from the certifying node 202.

In another exemplary embodiment, the incrementally trained ML model may be used to predict which users in a mobile application or game may purchase in-app purchases (IAP). In such scenario, the measure of quality of the candidate ML model is determined by compare the predictive outcome value with the actual purchase amounts.

Figure 5A:
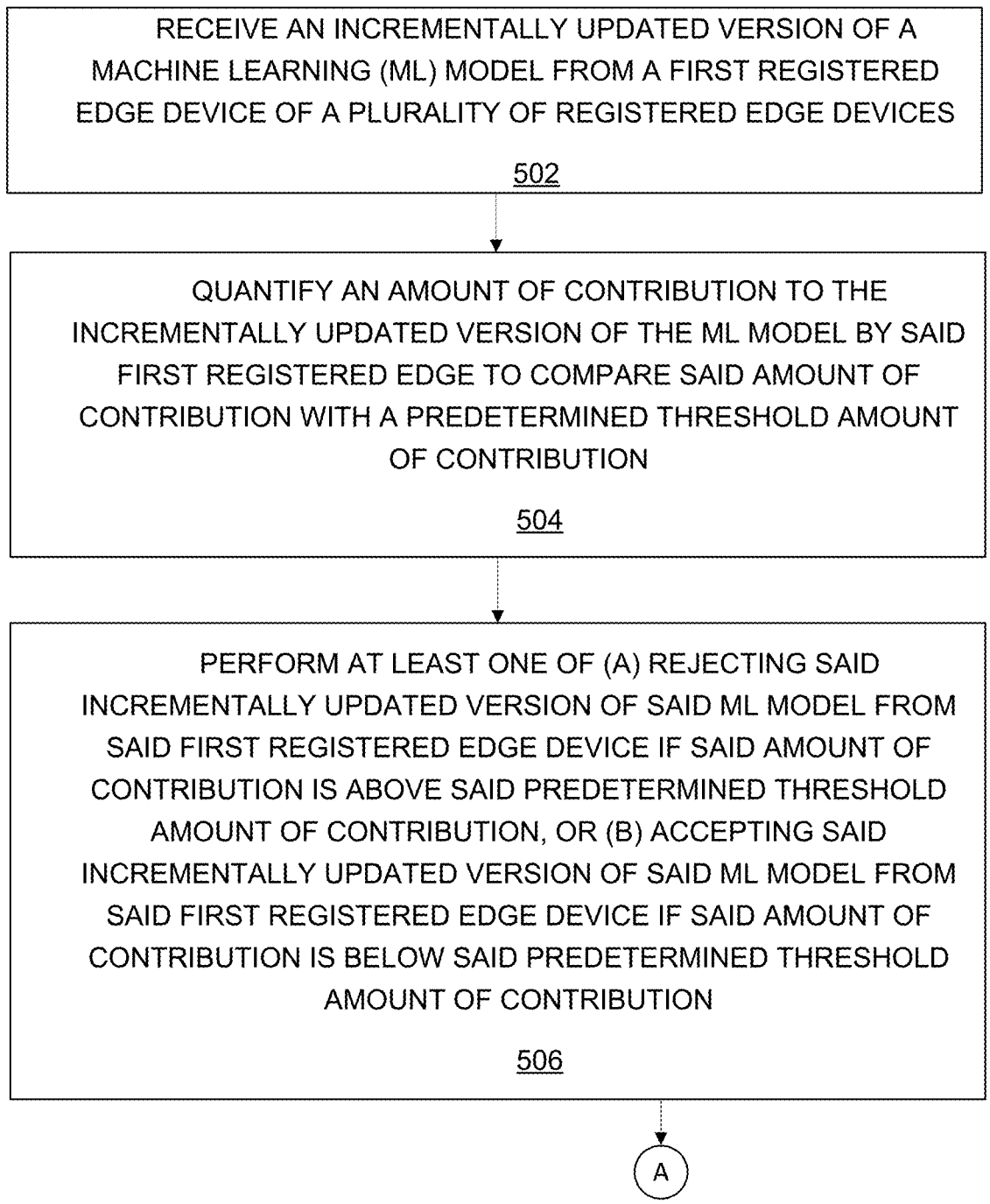
FIGS. 5A-5B depict a flow chart illustrating a method of maintaining network integrity during incremental training of machine learning models at one or more edge devices in a peer to peer network, in accordance with the embodiments herein.
Figure 5B:
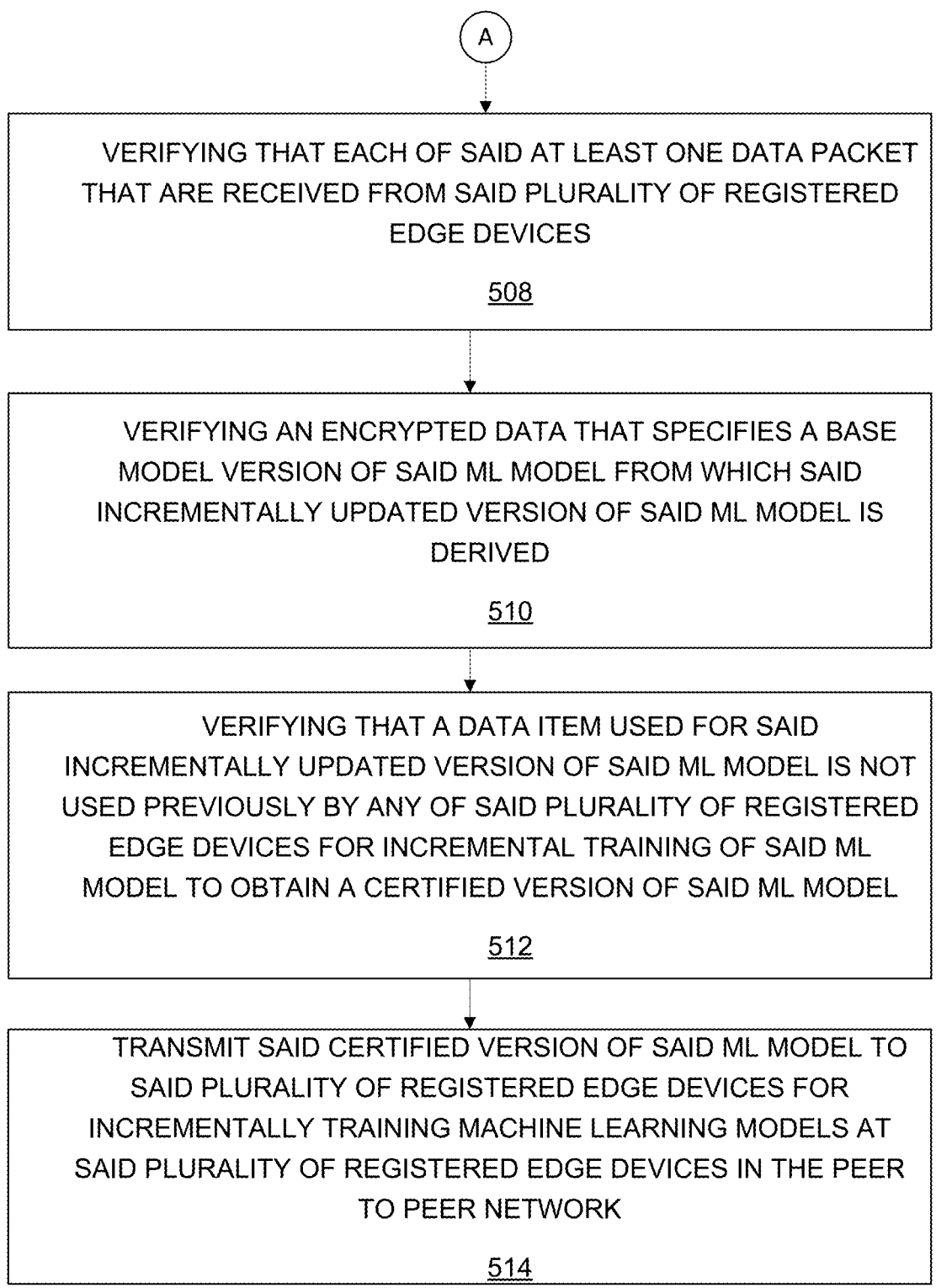

FIGS. 5A-5B depict a flow chart that illustrating a method of maintaining network integrity for incrementally training of ML models at one or more edge devices 102A-N in a peer to peer network, in accordance with the embodiments herein. A certifying node 202 registers one or more edge devices 102A-N with the peer to peer network by providing an encrypted identifier token. In an embodiment, the encrypted identifier token is based on one or more of a login credentials associated with a user or a device identifier of one or more edge devices.

The encrypted identifier token cannot be tampered or spoofed, and acts as proof of authenticity of the edge device in all future interactions. The encrypted identifier token also specifies a base version of the ML model version from which an updated ML model version is obtained. Subsequent to registration, each of the one or more registered devices incrementally update their respective base version of ML models upon occurrence of event at the respective edge devices as described earlier along with FIG. 2. At step 502, the certifying node 202 receives an incrementally updated version of a machine learning (ML) model from a first registered edge device of a plurality of registered edge devices. At step 504, the certifying node 202, quantifies an amount of contribution to the incrementally updated version of the ML model by said first registered edge to compare said amount of contribution with a predetermined threshold amount of contribution. In an embodiment, the predetermined threshold of contribution is determined based on a number of edge devices registered with the certifying node at any given time. In an embodiment, the predetermined threshold of contribution may be preset based on requirements of an application of the system.

At step 506, the certifying node 202 performs at least one of (a) rejecting said incrementally updated version of said ML model from said first registered edge device if said amount of contribution is above said predetermined threshold amount of contribution, or (b) accepting said incrementally updated version of said ML model from said first registered edge device if said amount of contribution is below said predetermined threshold amount of contribution. Limiting the contribution by each of the one or more registered edge devices 102A-N enables prevention of skew by any of the one or more registered edge devices 102A-N at the certifying node 202 by prevention of transmission of unusually large amount of data by each edge device compared to other edge devices. At step 508, upon accepting the incrementally updated ML model version, certifying node 202 verifies that each of said at least one data packet associated with said incrementally updated ML model is received from said plurality of registered edge devices. At step 510, the certifying node 202 verifies an encrypted data that specifies a base model version of said ML model from which said incrementally updated version of said ML model is derived. At step 512, the certifying node 202 verifies that a data item used for said incrementally updated version of said ML model is not used previously by any of said plurality of registered edge devices for incremental training of said ML model to obtain a certified version of said ML model. At step 514, the certifying node 202 transmits said certified version of said ML model to said plurality of registered edge devices for incrementally training machine learning models at said plurality of registered edge devices in the peer to peer network.

Figure 5C:
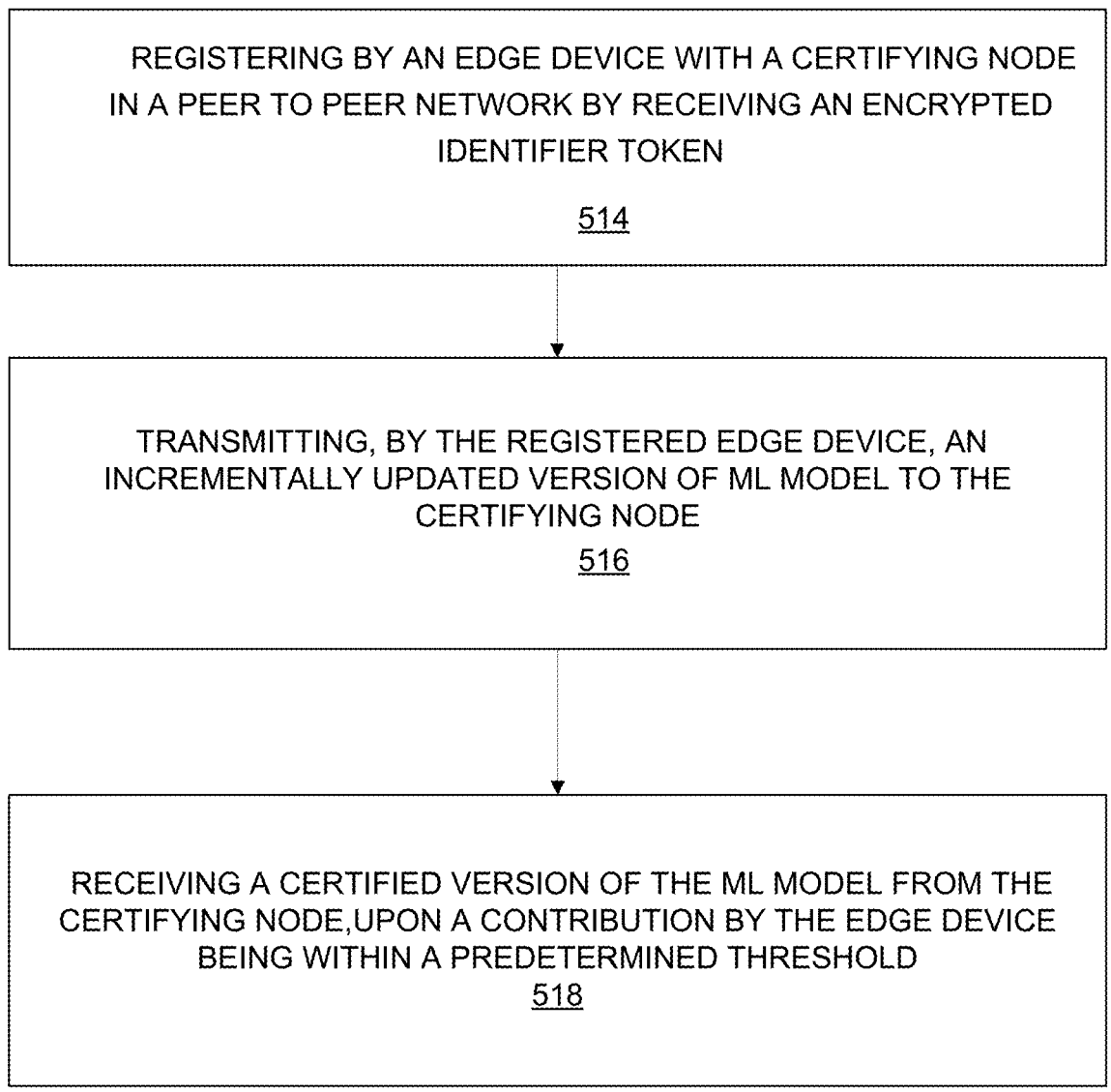
FIG. 5C depicts a flow chart illustrating a method of incremental training of machine learning models at one or more edge devices while maintaining a network integrity of a peer to peer network, in accordance with the embodiments herein.

FIG. 5C depicts a flow chart illustrating a method of incremental training of ML models at one or more edge devices 102A-N while maintaining a network integrity of a peer to peer network, in accordance with the embodiments herein. At step 514, the method includes registering an edge device 102A with the certifying node 202 in a peer to peer network by receiving an encrypted identifier token. At step 516, the method includes transmitting an incrementally updated version of the ML model to the certifying node 202. In some embodiments, the certifying node 202 accepts the incrementally updated ML model version from the edge device 102A if a contribution of the edge device is within a predetermined threshold, and rejects the incrementally updated ML model version from the edge device 102A if the contribution is beyond the predetermined threshold. Limiting the contribution by each edge device enables prevention of skew by any of the edge devices at the certifying node by prevention of transmission of unusually large amount of data by each edge device compared to other edge devices. At step 518, the method includes receiving a certified version of the ML model from the certifying node 202, upon a contribution by the edge device 102A being with a predetermined threshold.

In an exemplary embodiment, the peer to peer network of devices is configured to perform certification for incremental training of ML models with patient data at one or more edge devices 102A-N associated with a peer to peer network. The patient data may include demographics such as age, gender, and ethnicity, socio-economic data, risk factors such as obesity, high blood pressure and diabetes etc., laboratory data or diagnostic report, treatment data, and clinical outcome with respect to treatment. A first edge device 102A of the peer to peer network of devices may train a first candidate ML model with a first patient data associated with the first edge device 102A and may transmit the first candidate ML model to a certifying node 202 for certification. The certifying node 202 determines the measure of quality of the first candidate ML model based on a predictive outcome value of the first candidate ML model on a test data set. The certifying node 202 certifies the first candidate ML model if a quality of the first candidate ML model is high, monotonic increasing or remains constant. Then, the certifying node 202 transmits a certified first candidate ML model to the first edge device 102A or other edge devices of the one or more edge devices 102A-N for use in real time incremental training or for use in real time decision making. A second edge device 102B of the peer to peer network of devices may train the certified first candidate ML model with a second patient data associated with the second edge device 102B and may transmit a second candidate ML model to the certifying node for certification. The certifying node 202 verifies whether data update to the second candidate ML model is layered on top of the certified first candidate ML model and determines the measure of quality of the second candidate ML model for certification. Further, the certifying node 202 may maintain a record of a number of data points that is used by each of the one or more edge devices 102A-N for incrementally training the candidate ML model to prevent undue contribution by each of the one or more edge devices 102A-N for incremental training of the candidate ML model. The certifying node 202 may ensure that net contribution by each of the one or more edge devices 102A-N is below a threshold value to prevent against undue influence of any of one or more edge devices 102A-N. The certifying node 202 may prevent a denial of service (DOS) attack by declining to accept more than an undue share of inputs from a given edge device. The candidate ML model is devoid of the patient data is used to train the candidate ML model incrementally. Rather, the candidate ML model include one or more parameters and one or more weights associated with the parameters.

In an exemplary embodiment, the peer to peer network of devices is configured to perform certification for incremental training of ML models with user data of one or more applications at one or more edge devices 102A-N. Incrementally trained ML models may be used for targeting audiences to deliver "application install advertising". A certifying node of the peer to peer network of devices certifies the incrementally trained ML models by ensuring its quality.

Figure 6:
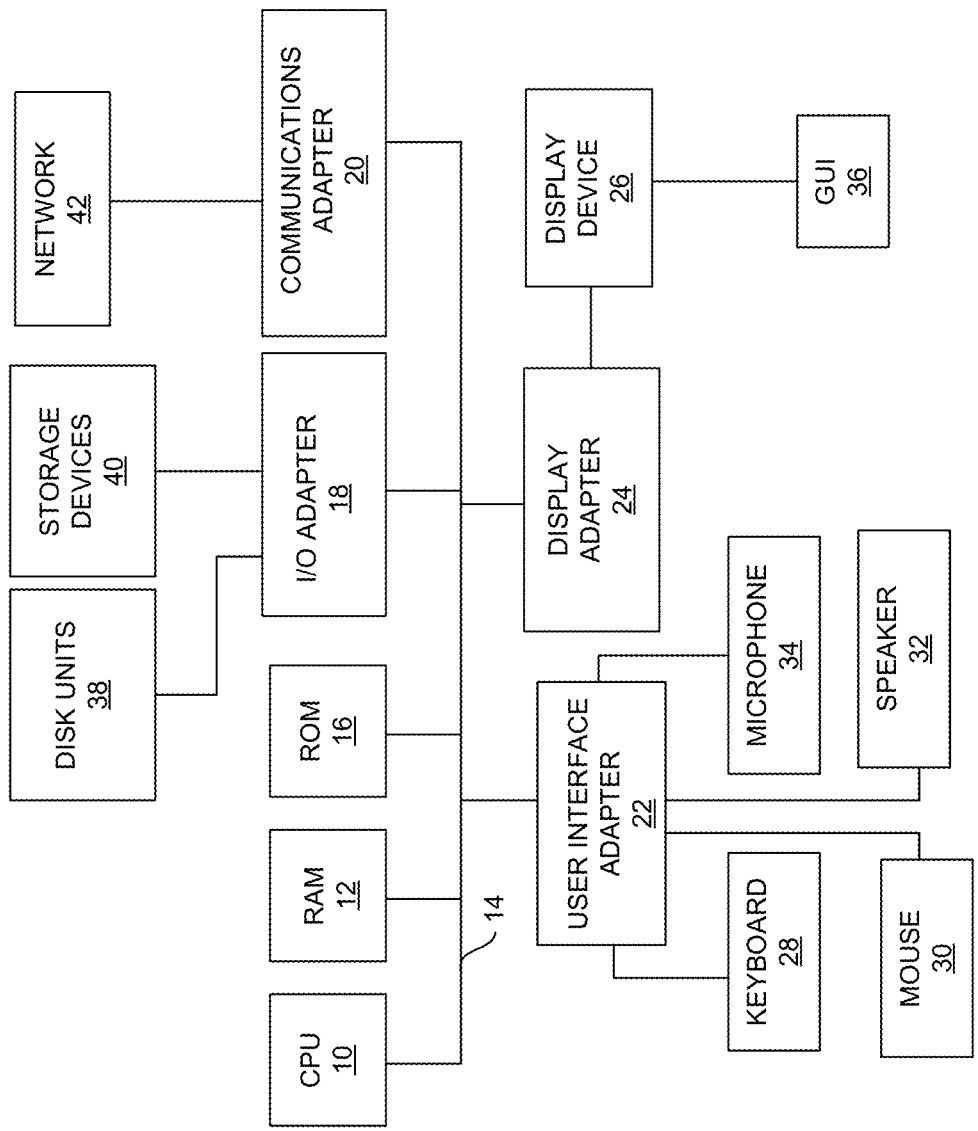
FIG. 6 is a schematic diagram of computer architecture of a certifying node and/or an edge device, in accordance with the embodiments herein.

FIG. 6 is a schematic diagram of computer architecture of a certifying node and/or an edge device in accordance with the embodiments herein. A representative hardware environment for practicing the embodiments herein is depicted in FIG. 6, with reference to FIGS. 1 through 5. This schematic drawing illustrates a hardware configuration of a server/computer system/computing device in accordance with the embodiments herein. The system includes at least one processing device CPU 10 that may be interconnected via system bus 14 to various devices such as a random-access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A certifying node for maintaining a network integrity for incrementally training machine learning models at one or more edge devices in a peer to peer network, wherein the certifying node is communicatively connected with the one or more edge devices in the peer to peer network, wherein said certifying node is configured to:
    receive an incrementally updated version of a machine learning (ML) model from a first registered edge device of a plurality of registered edge devices;
    quantify an amount of contribution to the incrementally updated version of the ML model by said first registered edge to compare said amount of contribution with a predetermined threshold amount of contribution;
    perform at least one of (a) rejecting said incrementally updated version of said ML model from said first registered edge device if said amount of contribution is above said predetermined threshold amount of contribution, or (b) accepting said incrementally updated version of said ML model from said first registered edge device if said amount of contribution is below said predetermined threshold amount of contribution by:
        verifying that each of at least one data packet associated with said incrementally updated ML model that is received from said plurality of registered edge devices,
        verifying an encrypted data that specifies a base model version of said ML model from which said incrementally updated version of said ML model is derived, and
        verifying that a data item used for said incrementally updated version of said ML model is not used previously by any of said plurality of registered edge devices for incremental training of said ML model to obtain a certified version of said ML model, and
    transmit said certified version of said ML model to said plurality of registered edge devices for incrementally training machine learning models at said plurality of registered edge devices in the peer to peer network.

2. The certifying node of claim 1, wherein said certifying node is further configured to register said one or more edge devices with said peer to peer network based on a registration request from said one or more edge devices using an encrypted identifier token associated with said registration request to obtain the plurality of registered edge devices.

3. The certifying node of claim 1, wherein said certifying node is further configured to verify each of said at least one data packet from the plurality of registered edge devices using an encrypted identifier token, wherein the encrypted identifier comprises at least one of a login credential associated with a user of said plurality of registered edge devices or a device identifier of said plurality of registered edge devices for performing device based authentication.

4. The certifying node of claim 1, wherein said certifying node is further configured to determine the predetermined threshold of contribution based on a number of edge devices that are registered with said certifying node at any given time.

5. The certifying node of claim 1, wherein said certifying node is further configured to prevent skewing of said ML model by any of said plurality of registered edge devices by limiting said amount of contribution for at least one of said plurality of registered edge devices.

6. The certifying node of claim 5, wherein said certifying node is further configured to prevent skewing of said ML model by limiting a transmission of data by each of said plurality of registered edge devices compared an average transmission of data by said plurality of registered edge devices.

7. The certifying node of claim 1, wherein said certifying node is further configured to verify that said incrementally updated version of said ML model is derived from a latest certified version of said ML model using a persistent file format of said ML model encrypted with at least one of a unique signature of said plurality of registered edge devices, a timestamp of update, or a secret salting parameter.

8. The certifying node of claim 1, wherein said certifying node is further configured to prevent denial of services attack from said plurality of registered edge devices by implementing a logic for monitoring either a count of connection requests or a count of said incrementally updated version of said ML model submitted by each of said plurality of registered edge devices.

9. The certifying node of claim 8, wherein said certifying node is further configured to accept a connection request from said plurality of registered edge devices to said certifying node by validating an identifier token associated with each of said plurality of registered edge devices.

10. The certifying node of claim 1, wherein said certifying node is further configured to transmit the certified version of said machine learning model to said plurality of registered edge devices in said peer to peer network for use in said real time incremental training of said certified version of said machine learning model or for use in real-time decision making at said one or more edge devices.

11. A method of operating a certifying node of a peer to peer network that is configured to be coupled in communication with one or more edge devices of said peer to peer network, wherein said certifying node is configured to maintain network integrity for incrementally training machine learning models at one or more edge devices in a peer to peer network, wherein said method comprises configuring said certifying node to:
receive an incrementally updated version of a machine learning (ML) model from a first registered edge device of a plurality of registered edge devices;
quantify an amount of contribution to the incrementally updated version of the ML model by said first registered edge to compare said amount of contribution with a predetermined threshold amount of contribution;
perform at least one of (a) rejecting said incrementally updated version of said ML model from said first registered edge device if said amount of contribution is above said predetermined threshold amount of contribution, or (b) accepting said incrementally updated version of said ML model from said first registered edge device if said amount of contribution is below said predetermined threshold amount of contribution by:
verifying that each of said at least one data packet associated with said incrementally updated ML model is received from said plurality of registered edge devices,
verifying an encrypted data that specifies a base model version of said ML model from which said incrementally updated version of said ML model is derived, and
verifying that a data item used for said incrementally updated version of said ML model is not used previously by any of said plurality of registered edge devices for incremental training of said ML model to obtain a certified version of said ML model, and
transmit said certified version of said ML model to said plurality of registered edge devices for incrementally training machine learning models at said plurality of registered edge devices in the peer to peer network.

12. The method of claim 11, wherein the method further comprises configuring said certifying node to verify each of said at least one data packet from said plurality of registered edge devices using an encrypted identifier token, wherein the encrypted identifier comprises at least one of a login credential associated with a user of said plurality of registered edge devices or a device identifier of said plurality of registered edge devices for performing device based authentication.

13. The method of claim 11, wherein the method further comprises configuring said certifying node to determine the predetermined threshold of contribution based on a number of edge devices that are registered with said certifying node at any given time.

14. The method of claim 11, wherein the method further comprises configuring the certifying node to prevent skewing of said ML model by any of said plurality of registered edge devices by limiting said amount of contribution for at least one of said plurality of registered edge devices.

15. The method of claim 14, wherein the method further comprises configuring the certifying node to prevent skewing of said ML model by limiting a transmission of data by each of said plurality of registered edge devices compared an average transmission of data by said plurality of registered edge devices.

16. The method of claim 11, wherein the method further comprises configuring the certifying node to verify that said incrementally updated version of said ML model is derived from a latest certified version of said ML model using a persistent file format of said ML model encrypted with at least one of a unique signature of said plurality of registered edge devices, a timestamp of update, or a secret salting parameter.

17. The method of claim 11, wherein the method further comprises configuring the certifying node to prevent denial of services attack from said plurality of registered edge devices by implementing a logic for monitoring either a count of connection requests or a count of said incrementally updated version of said ML model submitted by each of said plurality of registered edge devices.

18. The method of claim 17, wherein the method further comprises configuring the certifying node to validate an identifier token associated with each of said plurality of registered edge devices that transmit a connection request to said certifying node.

19. The method of claim 11, wherein the method further comprises configuring the certifying node to accept a connection request from said plurality of registered edge devices to said certifying node by validating an identifier token associated with each of said plurality of registered edge devices.

20. A computer program product comprising a non-transitory computer-readable storage medium having computer-readable instructions stored thereon, computer-readable instructions being executable by a computerized device comprising processing hardware to execute a method of operating a certifying node of a peer to peer network, wherein said certifying node is configured to be coupled in communication with one or more edge devices of said peer to peer network, wherein said certifying node is configured to certify incrementally trained machine learning models, wherein said method comprises configuring said certifying node to:
receive an incrementally updated version of a machine learning (ML) model from a first registered edge device of a plurality of registered edge devices;

quantify an amount of contribution to the incrementally updated version of the ML model by said first registered edge to compare said amount of contribution with a predetermined threshold amount of contribution;
perform at least one of (a) rejecting said incrementally updated version of said ML model from said first registered edge device if said amount of contribution is above said predetermined threshold amount of contribution, or (b) accepting said incrementally updated version of said ML model from said first registered edge device if said amount of contribution is below said predetermined threshold amount of contribution by:
  verifying that each of said at least one data packet associated with said incrementally updated ML model is received from said plurality of registered edge devices,
  verifying an encrypted data that specifies a base model version of said ML model from which said incrementally updated version of said ML model is derived, and
  verifying that a data item used for said incrementally updated version of said ML model is not used previously by any of said plurality of registered edge devices for incremental training of said ML model to obtain a certified version of said ML model, and
transmit said certified version of said ML model to said plurality of registered edge devices for incrementally training machine learning models at said plurality of registered edge devices in the peer to peer network.

\* \* \* \* \*